United States Patent
Miyagi et al.

(10) Patent No.: US 7,508,164 B2
(45) Date of Patent: Mar. 24, 2009

(54) BATTERY PACK HAVING CONTROL DEVICES OF DIFFERING HEIGHTS

(75) Inventors: Yoshikazu Miyagi, Aichi (JP); Masahiro Misu, Aichi (JP); Toyohiko Eto, Aichi (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 14 days.

(21) Appl. No.: 11/559,497

(22) Filed: Nov. 14, 2006

(65) Prior Publication Data

US 2007/0108939 A1     May 17, 2007

(30) Foreign Application Priority Data

Nov. 15, 2005   (JP) ............................... 2005-329582

(51) Int. Cl.
*H01M 10/46* (2006.01)
(52) U.S. Cl. ...................................... 320/112
(58) Field of Classification Search ................. 320/107, 320/110, 112, 116
See application file for complete search history.

(56) References Cited

U.S. PATENT DOCUMENTS 5,917,175 A * 6/1999 Miller et al. ........... 235/472.01

FOREIGN PATENT DOCUMENTS

JP        2002-190288       7/2002

* cited by examiner

*Primary Examiner*—Edward Tso
(74) *Attorney, Agent, or Firm*—Workman Nydegger

(57) ABSTRACT

A battery pack including a compact controller for controlling a battery group. The battery pack includes a battery group, a controller for controlling the battery group, and a case for accommodating the controller. The controller includes a plurality of control devices, and an installation member for fixing the control devices in the case. The installation member includes a plurality of mounts for fixing the plurality of control devices. The control devices each have a widest portion, and the mounts have different heights so that the widest portions of at least adjacent ones of the control devices are located at different heights.

13 Claims, 6 Drawing Sheets

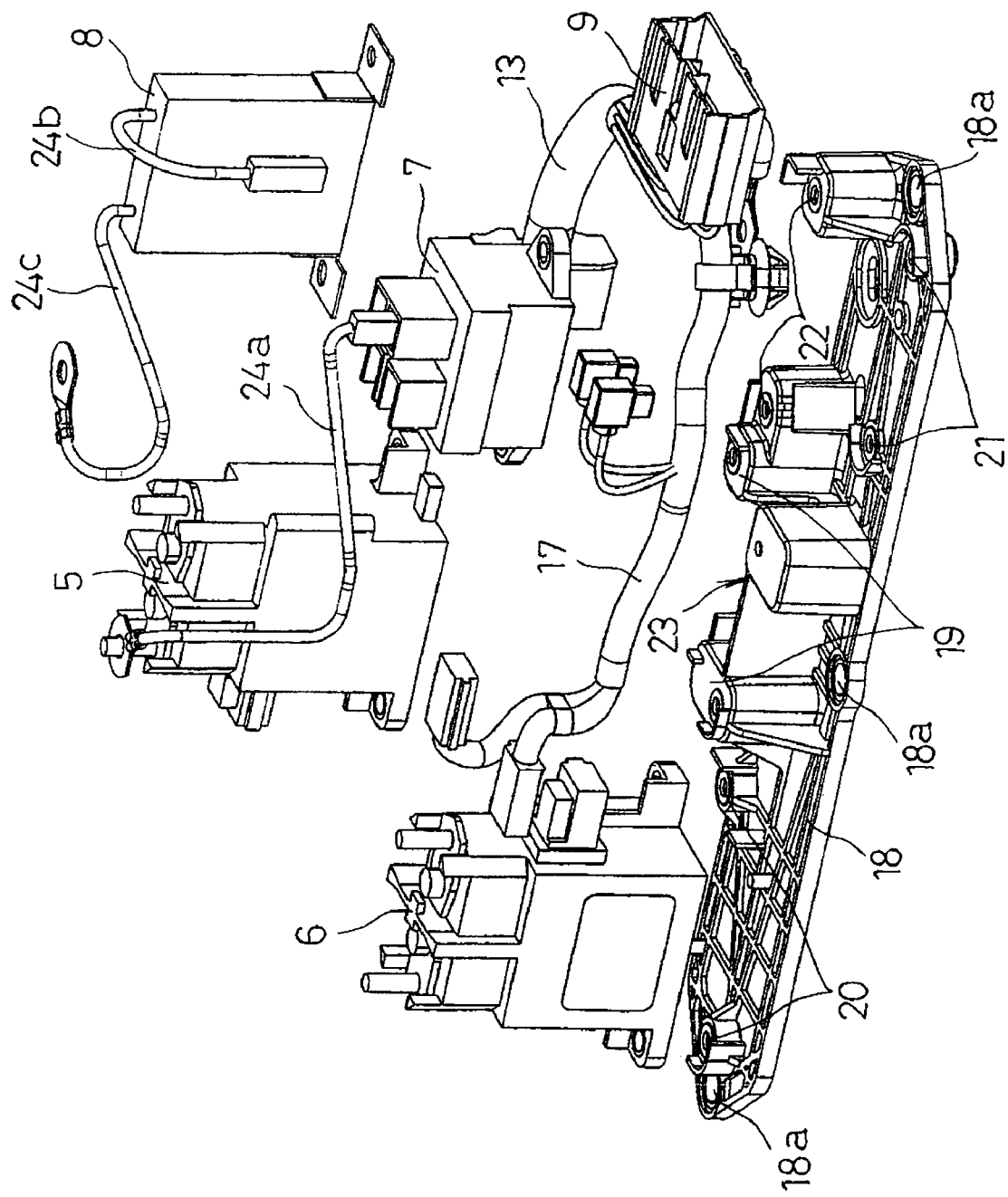

BATTERY PACK HAVING CONTROL DEVICES OF DIFFERING HEIGHTS

CROSS-REFERENCE TO RELATED APPLICATIONS

This application is based upon and claims the benefit of priority from prior Japanese Patent Application No. 2005-329582, filed on Nov. 15, 2005, the entire contents of which are incorporated herein by reference.

BACKGROUND OF THE INVENTION

The present invention relates to a battery pack, and more particularly, to a battery pack including a compact controller for controlling current flow.

Japanese Laid-Open Patent Publication No. 2002-190288 discloses a battery pack including a battery group of a plurality of rectangular batteries arranged in parallel configuration. The batteries are integrally held in a restrained state between two end plates, which are connected to each other. A controller controls the current flow when the battery group is charged and discharged. In the battery pack, the controller is arranged at one end of the battery group.

As shown in FIG. 1, the conventional controller 30 in the battery pack includes control devices such as cathode and anode main relays 31 and 32, a pre charge relay 33, and a resistor 34, each of which are spaced from each other and attached to the bottom surface of a case 35 for the controller 30. In FIG. 1, vibration absorption members 31a and 32a are respectively attached to the bottom surface of the main relays 31 and 32. A battery group 40 includes a plurality of batteries arranged in parallel configuration. The batteries are integrally held between two end plates 40a. Two connection cables 41 respectively connect the main relays 31 and 32 with a common cathode terminal and common anode terminal of the battery group 40. Two connection cables 42 connect the main relays 31 and 32 with an inverter of a vehicle.

Furthermore, a battery electronic control unit (ECU) 36 includes a communication connector 36a for communicating with an electronic control unit in the vehicle (vehicle ECU). The communication connector 36a is directly attached to the side surface of the case 35 facing toward an outlet 35a formed in the side surface of the case 35. The ECU 36 is connected to the vehicle ECU by the communication connector 36a and a signal wire harness 37. Part of the signal wire harness 37 extends out of the case 35. A side cover 38 covers the signal wire harness 37 located outside the case 35 so that the harness 37 cannot be accessed and to function as an electromagnetic shield. The side cover 38 is attached to an upper cover of the case 35, as shown by the phantom lines in FIG. 1.

However, in the conventional controller 30 shown in FIG. 1, space for installing each of the control devices 31 to 34 must be provided in the case 35. Furthermore, each of the control devices 31 to 34 can only be arranged along a place because of the difficulty in forming the case 35, which is made of steel plates, with a complicated shape. Therefore, a large space is required for the controller 30. Further, space for the signal wire harness 37 from the case 35 is necessary to prevent the signal wire harness 37 from being damaged by the edges of the case 35, and the signal wire harness 37 must be covered by a crimped or corrugated tube. This increases the necessary space and cost. Moreover, the controller 30 cannot have a large dimension in a direction perpendicular to the parallel configuration direction of the batteries. Thus, dimension B of the case 35 taken in the parallel configuration direction of the batteries in the battery group 2 is large. In this manner, a large space is necessary to install the battery pack, and it is difficult to save space with the conventional controller 30.

In the conventional controller 30, the side cover 38 covering the signal wire harness 37 of the ECU 36 must be attached to the upper cover of the case 35. This further increases costs. Further, a measure for coping with the edges of the steel plate of the case 35 is necessary at locations of the case 35 where the signal wire harness 37 is inserted. This also increases costs.

SUMMARY OF THE INVENTION

The present invention provides a battery pack including a compact controller for controlling the battery group.

One aspect of the present invention is a battery pack including a battery group. A controller controls the battery group. A case accommodates the controller. The controller includes a plurality of control devices and an installation member for fixing the plurality of control devices in the case. The installation member includes a plurality of mounts for fixing the control devices. The control devices each have a widest portion. The mounts have different heights so that the widest portions of at least adjacent ones of the control devices are located at different heights.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is an exploded perspective view of the control devices and installation member in the controller.

DETAILED DESCRIPTION OF THE PREFERRED EMBODIMENTS

Figure 1:
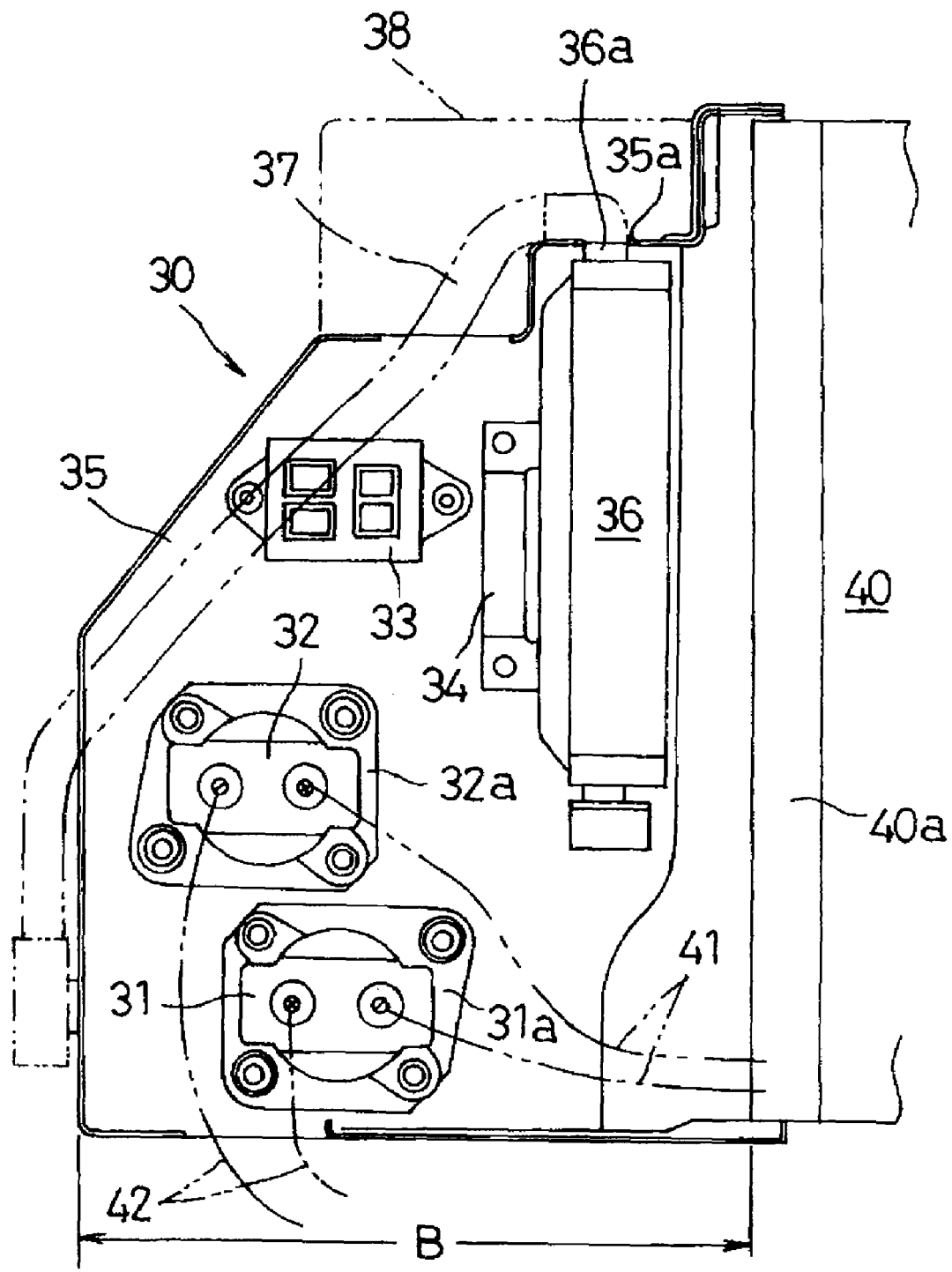
FIG. 1 is a plan view showing a controller of a battery pack in the prior art.

In the drawings, like numerals are used for like elements throughout.

A battery pack 1 according to a preferred embodiment of the present invention will now be described with reference to FIGS. 2 to 6.

Figure 2:
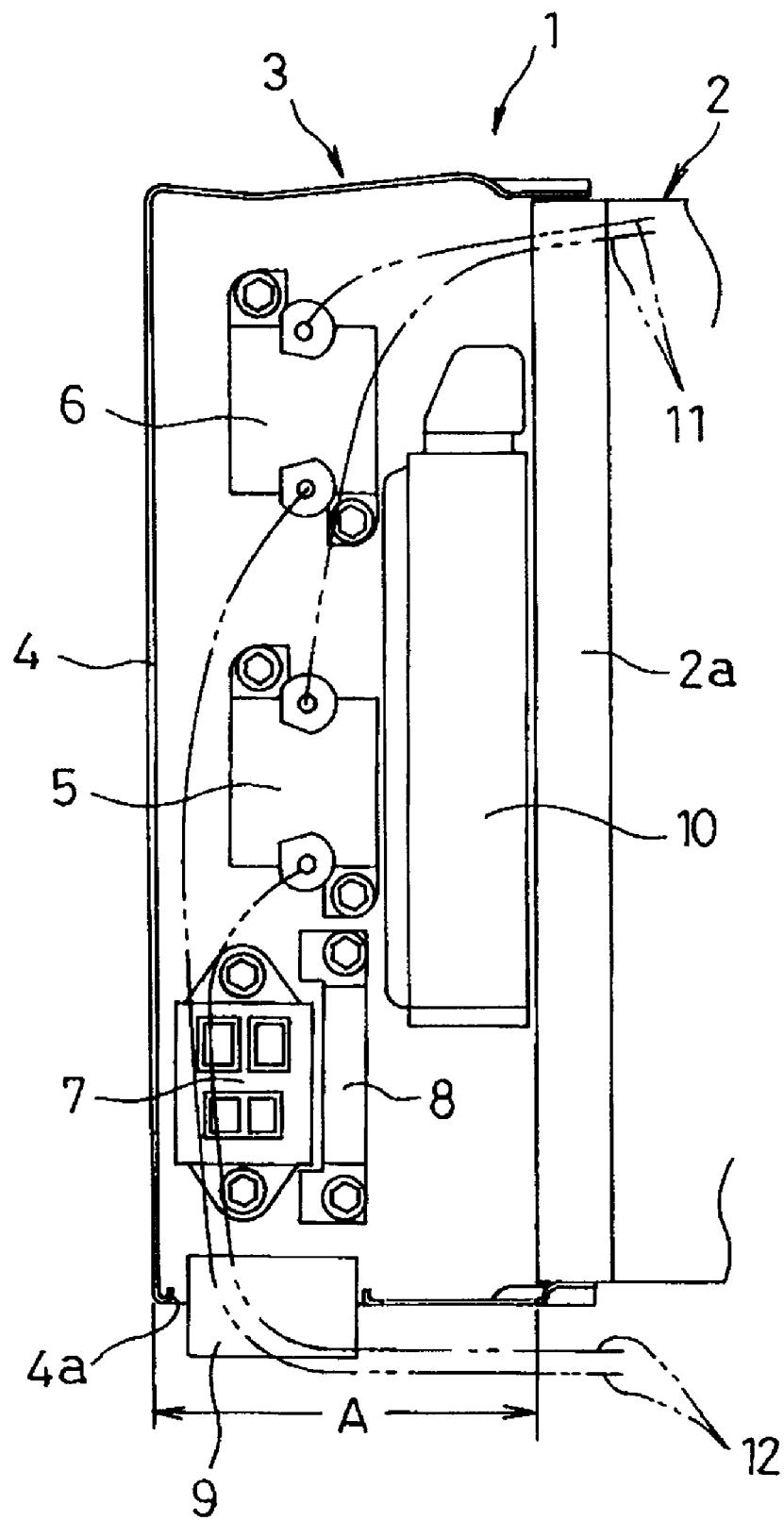
FIG. 2 is a plan view showing a battery pack controller according to a preferred embodiment of the present invention.

Referring to FIG. 2, the battery pack 1 includes a battery group 2, a controller 3, and a case 4. The battery group 2 includes a plurality of batteries arranged in parallel configuration. The battery group 2 is held between two end plates 2a, which are connected to each other so as to integrally restrain the plurality of batteries. The controller 3 is arranged beside one of the end plates 2a for the battery group 2.

The controller 3 includes a cathode main relay 5, an anode main relay 6, a pre charge relay 7, and a resistor 8, all of which are arranged in the case 4. A connector 9 for a vehicle electronic control unit (ECU) 15 (see FIG. 3) is arranged in an opening 4a formed in one side of the case 4. A battery electronic control unit (ECU) 10 for generating a first control signal based on signals indicating the temperature, voltage, and the like of each battery in the battery group 2 is arranged in the case 4 adjacent to the battery group 2. A first pair of connection cables 11 connects a common cathode terminal and common anode terminal of the battery group 2 to the main relays 5 and 6, respectively. A second pair of connection cables 12 connects the main relays 5 and 6 to an inverter 16 (see FIG. 3) of the vehicle.

Figure 3:
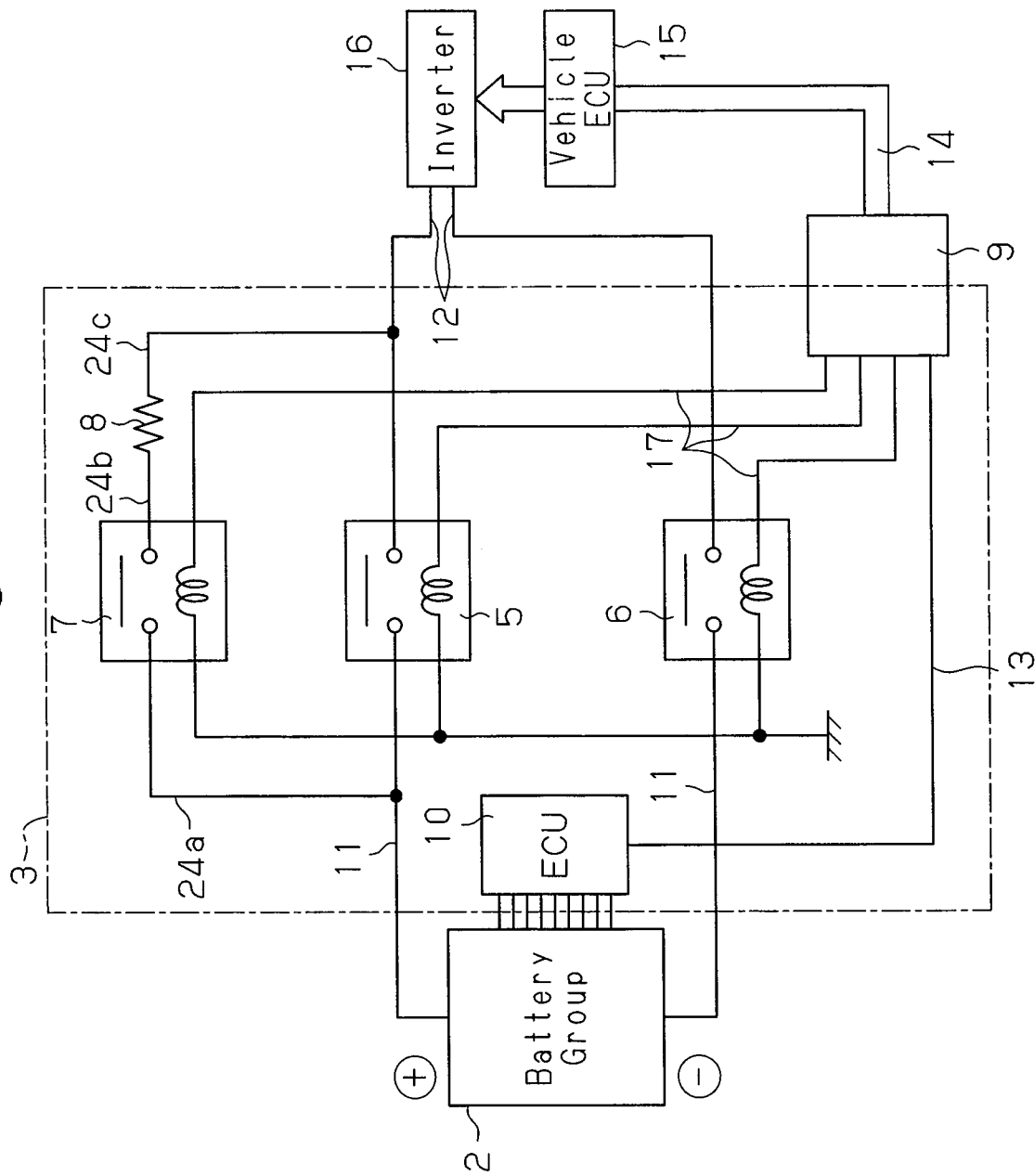
FIG. 3 is a circuit diagram of the controller.

In FIG. 3, the first control signal generated by the ECU 10 is provided to a vehicle ECU 15 via a signal wire harness 13, the connector 9, and a signal wire harness 14. The vehicle ECU 15 generates a second control signal, and provides the second control signal to the main relays 5 and 6 and the pre charge relay 7 via the signal wire harness 14, the connector 9, and a signal wire harness 17 to control the operation of the main relays 5 and 6 and the pre charge relay 7. The vehicle ECU 15 also controls the operation of the inverter 16. The pre charge relay 7 and the resistor 8 are connected in parallel to the cathode main relay 5. The pre charge relay 7 and the main relay 6 are turned ON before the main relay 5 is turned ON so that current flows via the resistor 8. This prevents the flow of excessive inrush current.

Figure 4:
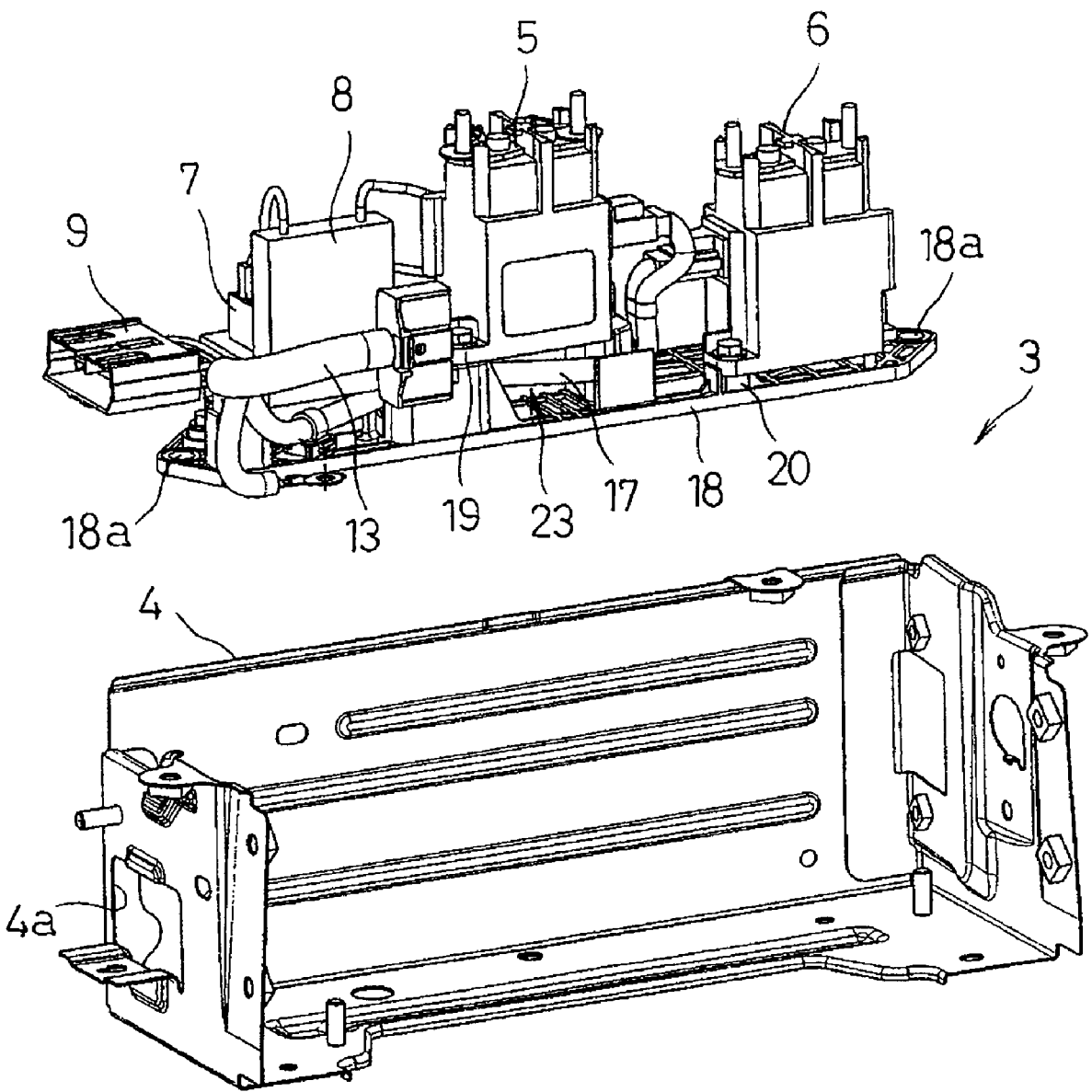
FIG. 4 is a perspective view showing a state in which the controller is separated from the case.

The configuration of the controller 3 will now be described with reference to FIGS. 4 to 6. As shown in FIG. 4, the cathode main relay 5, the anode main relay 6, the pre charge relay 7, and the resistor 8 are attached to an installation member 18, which is molded from synthetic resin and accommodated in the case 4. The installation member 18 is fixed to the bottom surface of the case 4.

Figure 5:
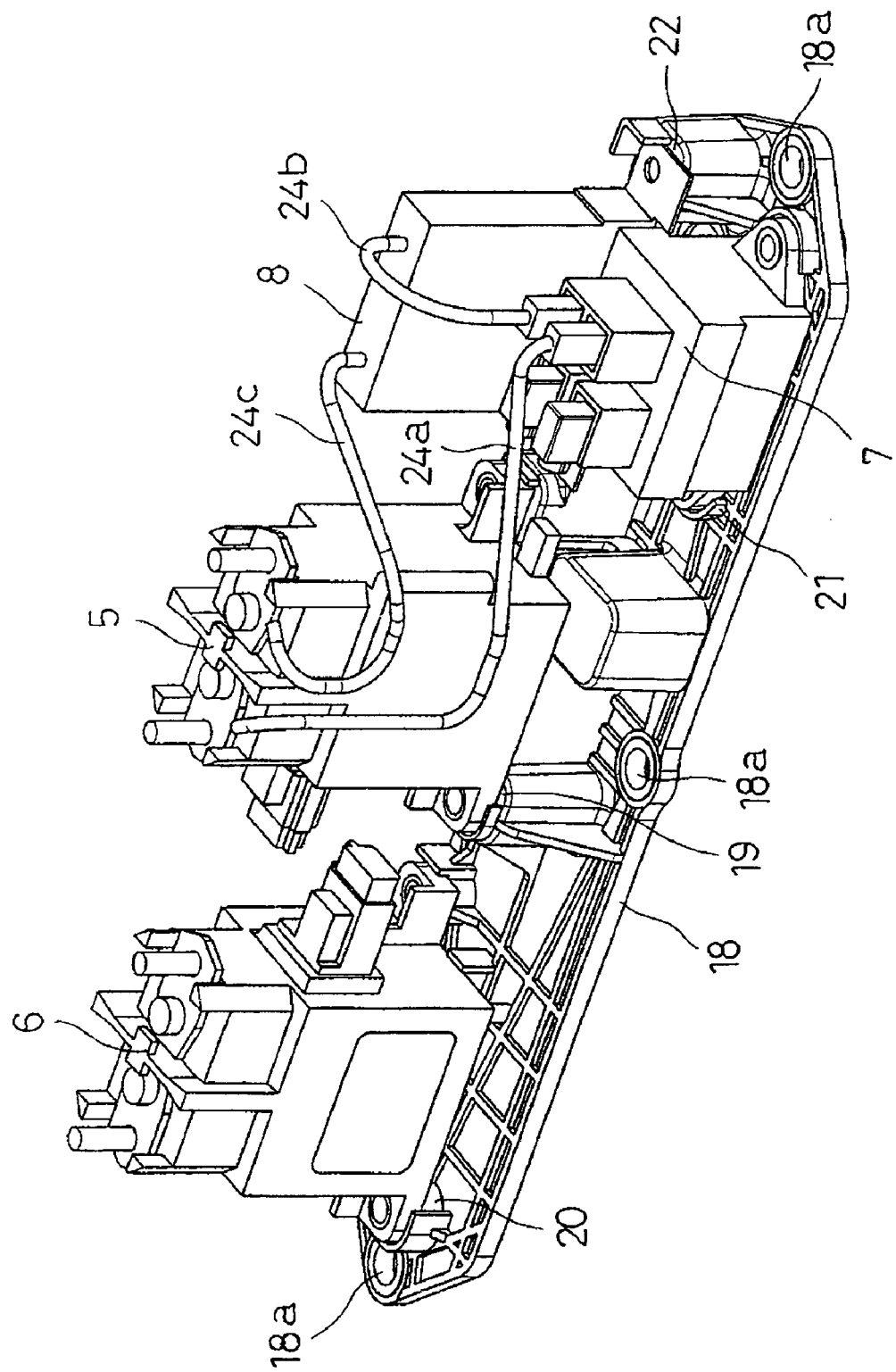
FIG. 5 is a perspective view showing an installation member attached to control devices in the controller.

The installation member 18 is elongated in the widthwise direction of the battery pack 1, as shown in FIGS. 5 and 6. The widthwise direction is orthogonal to the parallel configuration direction of the batteries in the battery group 2. Fastening holes 18*a* for the case 4 extend through the installation member 18 at two longitudinal ends and a middle part of a first side. Relatively high mounts 19 for the cathode main relay 5 project from the middle part of the installation member 18. Relatively low mounts 20 for the anode main relay 6 project from a first end, with respect to the longitudinal direction, of the installation member 18. Mounts 21 for the pre charge relay 7 and mounts 22 for the resistor 8 are arranged in parallel on the second end of the installation member 18 opposite the first end. The mounts 22 are located near the battery group 2. The heights of the mounts 19 to 22 are determined so that the portions widest in adjacent ones of the control devices 5 to 8 are located at different heights. For example, the height of the mounts 21 is substantially the same as the height of the upper surface of the installation member 18, and the height of the mounts 22 is slightly lower than the height of the mounts 19.

A lower space is formed between the mounts 19 and the middle part of the installation member 18. The lower space extends through the longitudinal direction of the installation member 18 and is used as a wiring space 23 for arrangement of the signal wire harness 17. Connection cables 24*a*, 24*b*, and 24*c* shown in FIGS. 5 and 6 connect the pre charge relay 7 and the resistor 8 to two terminals of the cathode main relay 5.

In the battery pack 1 of the above structure, control devices such as the cathode main relay 5, the anode main relay 6, the pre charge relay 7, and the resistor 8 are attached to the mounts 19 to 22 of the installation member 18 and connected to the signal wire harness 17 before being accommodated in the case 4. The installation member 18 is then arranged in the case 4 to form the controller 3. Therefore, the control devices 5 to 8 are attached to the compact installation member 18 in a spatially efficient manner. Referring to FIG. 2, dimension A of the controller 3 taken in the parallel configuration direction of the batteries in the battery group 2 is much smaller than dimension B of the conventional controller taken in the same direction. Thus, the controller 3 occupies less space, and the battery pack 1 is space-efficient.

The attachment of the control devices 5 to 8 to the installation member 18 is efficiently performed outside the case 4 where there is much space. Further, when connecting the signal wire harness 17 to the control devices 5 to 8, the connection cable 11 to the battery group 2, and the connection cable 12 to the inverter 16 of the vehicle, the different heights of the mounts 19 to 22 in the installation member 18 prevent wires from interfering with one another. This improves the wiring efficiency even though the controller 3 has a compact structure.

In particular, the mounts 19 at the middle part of the installation member 18 are the highest. Thus, the wiring space 23 formed under the mounts 19 is three-dimensional. This allows the size of the installation member 18 to be further reduced.

Furthermore, the installation member 18 is molded from synthetic resin. Thus, the installation member 18 is easily molded even though it has a complicated shape including the mounts 19 to 22 having different heights and the wiring space 23 under the mounts 19. Moreover, the installation member 18 may function to absorb vibrations, and the signal wire harnesses 17 and 13 are not damaged by edges such as when using steel plates.

The ECU 10 and the signal wire harness 13 are arranged in the case 4 in a state in which the control devices are completely accommodated in the case 4. Thus, the ECU 10 is installed in a state less likely to be subjected to impacts. Further, there is no need for a cover that covers the upper portion of the case 4 to have a complicated structure in order to prevent the signal wire harness 13 of the ECU 10 from being accessed or for functioning as an electromagnetic shield. Additionally, the connection with the vehicle ECU 15 is simplified since the signal wire harnesses 13 and 17 are accommodated in the case 4 and connected to the same connector 9.

In the battery pack of the present invention, the control devices arranged in the case of the controller are attached to the compact installation member in advance. Then, the installation member is arranged in the case. This reduces the size of the controller for controlling the battery group and uses space efficiently. Therefore, the battery pack of the present invention is particularly useful when there is a strong demand for a battery pack that occupies less space, such as a battery pack functioning as a power supply for driving various types of electric vehicles including hybrid electric vehicles.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A battery pack comprising:
a battery group;
a controller for controlling the battery group; and
a case for accommodating the controller, with the controller including a plurality of control devices and an installation member for fixing the plurality of control devices in the case, wherein the installation member includes a plurality of mounts for fixing the control devices, the control devices each have a widest portion, and the mounts have different heights so that the widest portions of at least adjacent ones of the control devices are located at different heights.

2. The battery pack according to claim 1, wherein the controller includes a wiring space arranged between the installation member and at least one of the mounts.

3. The battery pack according to claim 1, wherein the installation member is molded from resin.

4. The battery pack according to claim 1, wherein the controller includes a battery electronic control unit, a connector, and a signal wire harness for connecting the electronic control unit and the connector in the case.

5. The battery pack according to claim 1, wherein:
the plurality of control devices include a cathode main relay, an anode main relay, a pre charge relay, and a resistor;
the installation member is elongated and has a first end, a middle part, and a second end opposite the first end; and
the cathode and anode main relays are respectively arranged in the middle part and the first end of the installation member, and the pre charge relay and the resistor are arranged in parallel at the second end of the installation member.

6. A controller for controlling the operation of a plurality of batteries within a battery pack, the controller comprising:
a case defining an interior space and configured to accommodate a plurality of control devices operably connected to the plurality of batteries;
an installation member disposed within the interior space;
a plurality of mounts disposed on the installation member, wherein each of the mounts supports a respective control device and at least some of the mounts have a predefined configuration such that adjacent control devices are oriented within the interior space at different heights with respect to one another.

7. The controller according to claim 6, further comprising a wiring space arranged between the installation member and at least one of the mounts.

8. The controller according to claim 6, wherein the installation member comprises a resin material.

9. The controller according to claim 6, further comprising:
a battery electronic control unit;
a connector; and
a signal wire harness configured to connect the electronic control unit and the connector in the case.

10. The controller according to claim 6, wherein:
the plurality of control devices include a cathode main relay, an anode main relay, a pre charge relay, and a resistor;
the installation member is elongated and has a first end, a middle part, and a second end opposite the first end; and
the cathode and anode main relays are respectively arranged in the middle part and the first end of the installation member, and the pre charge relay and the resistor are arranged in parallel at the second end of the installation member.

11. The controller according to claim 10, wherein the cathode relay is oriented at a height within the interior space that is relatively greater than the relative height of the anode main relay and a relative height of at least one of the pre charge relay and the resistor.

12. The controller according to claim 6, wherein a mount disposed at a middle region of the installation member has a height that is greater than a mount disposed at an end of the installation member.

13. A battery pack comprising:
a plurality of batteries forming a battery group;
a controller having a plurality of control devices, the controller electrically connected to the battery group and configured to control at least one operating parameter of the battery group; and
a case defining an interior space that is configured to accommodate the controller;
an installation member disposed within the interior space, wherein the installation member is elongated and has a first end, a middle part, and a second end opposite the first end; and
a plurality of mounts disposed on the installation member, wherein each of the mounts supports a respective control device in a manner such that control devices supported in the region of the middle part of the installation member are oriented at a height within the interior space that is relatively higher than a height of control devices that are supported in the region of the first end and the second end of the installation member.

* * * * *